United States Patent
Hashimoto et al.

(10) Patent No.: US 8,176,316 B2
(45) Date of Patent: May 8, 2012

(54) VALIDATION SERVER, VALIDATION METHOD, AND PROGRAM

(75) Inventors: Yoko Hashimoto, Yokohama (JP); Takahiro Fujishiro, Yokohama (JP); Masahiko Furuya, Narashino (JP); Masami Uzawa, Tokyo (JP); Shingo Hane, Tokyo (JP); Akane Sato, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 529 days.

(21) Appl. No.: 12/392,430

(22) Filed: Feb. 25, 2009

(65) Prior Publication Data

US 2009/0300349 A1    Dec. 3, 2009

(30) Foreign Application Priority Data

May 30, 2008    (JP) ................................. 2008-142197

(51) Int. Cl.
    *H04C 29/06*    (2006.01)
(52) U.S. Cl. ......................................... 713/156; 380/28
(58) Field of Classification Search .................. 713/156; 380/28
    See application file for complete search history.

(56) References Cited

U.S. PATENT DOCUMENTS

| | | | | |
|---|---|---|---|---|
| 6,834,112 | B1 * | 12/2004 | Brickell | 380/279 |
| 7,681,046 | B1 * | 3/2010 | Morgan et al. | 713/193 |
| 2002/0029200 | A1 | 3/2002 | Dulin et al. | |
| 2004/0039925 | A1 * | 2/2004 | McMillan et al. | 713/189 |
| 2006/0123227 | A1 * | 6/2006 | Miller et al. | 713/156 |
| 2008/0086634 | A1 * | 4/2008 | Salowey et al. | 713/156 |
| 2011/0103586 | A1 * | 5/2011 | Nobre | 380/270 |

FOREIGN PATENT DOCUMENTS

| | | |
|---|---|---|
| EP | 1 191 743 A | 3/2002 |
| GB | 2 384 404 A | 7/2003 |
| GB | A-2384404 * | 7/2003 |

OTHER PUBLICATIONS

European Search Report issued in European Patent Application No. 09 00 2777.2 dated Sep. 17, 2009.
SafeNet, "Luna SA 4.2," [online], SafeNet, P.1[accessed Jan. 21, 2008], Internet <http://www.safenet-inc.com/library/3/Luna_SA.pdf>).
SafeNet, "Luna PCM 2.2," [online], SafeNet, P.1, [accessed Jan. 21, 2008], Internet <http://www.safenet-inc.com/library/3/LunaPCM.pdf>).
nCipher, "net HSM," [online], nCipher, P.1, [accessed Jan. 21, 2008], Internet Http://www.ncipher.com/uploads/resources/nethsm.pdf>).

* cited by examiner

*Primary Examiner* — Kambiz Zand
*Assistant Examiner* — Abiy Getachew
(74) *Attorney, Agent, or Firm* — McDermott Will & Emery LLP

(57) ABSTRACT

A validation server using HSM, which reduces required process time from receiving a validation request to responding with a validation result, and comprises a first software cryptographic module 142 and a second software cryptographic module 143 on a validation server 130 whose HSM is coupled with an I/F part 148. According to the validation server, load states of HSM, the first software cryptographic module 142 and the second software cryptographic module 143 are monitored by a cryptographic module monitor unit 141, and when cryptographic calculations in a validation process of certificates are conducted, the cryptographic calculations are executed by using the least loaded cryptographic module selected at a cryptographic module selector unit 140.

12 Claims, 9 Drawing Sheets

FIG. 3

| CRYPTOGRAPHIC MODULE IDENTIFIER | CONFIGURATION INFORMATION | KEY MANAGEMENT FLAG |
|---|---|---|
| HSM | P11LibPath=/opt/aaa/HSM.so<br>SlotID=1 | Y |
| FIRST SOFTWARE CRYPTOGRAPHIC MODULE | P11LibPath=/opt/aaa/Soft01.so<br>SlotID=3 | — |
| SECOND SOFTWARE CRYPTOGRAPHIC MODULE | P11LibPath=/opt/aaa/Soft02.so<br>SlotID=5 | — |
| ⋮ | ⋮ | ⋮ |

FIG. 4

| CRYPTOGRAPHIC ALGORITHM | | HSM | FIRST SOFTWARE CRYPTOGRAPHIC MODULE | SECOND SOFTWARE CRYPTOGRAPHIC MODULE | ⋯ |
|---|---|---|---|---|---|
| HASH ALGORITHM | SHA-1 | ○ | ○ | ○ | ⋮ |
| | SHA-256 | ○ | ○ | ○ | ⋮ |
| | SHA-512 | ○ | × | ○ | ⋮ |
| | ⋯ | ⋯ | ⋯ | ⋯ | ⋯ |
| PUBLIC KEY ENCRYPTION ALGORITHM | RSA | ○ | ○ | ○ | ⋮ |
| | DSA | × | ○ | ○ | ⋮ |
| | ⋯ | ⋯ | ⋯ | ⋯ | ⋯ |

| CRYPTOGRAPHIC MODULE IDENTIFIER | LOAD STATE |
|---|---|
| HSM | 3ms |
| FIRST SOFTWARE CRYPTOGRAPHIC MODULE | 5ms |
| SECOND SOFTWARE CRYPTOGRAPHIC MODULE | 5ms |
| ⋮ | ⋮ |

VALIDATION SERVER, VALIDATION METHOD, AND PROGRAM

BACKGROUND

The present invention relates to technology for validating certificates.

When transmitting an electronic data such as an electronic document, the sender's digital signature (hereinafter also referred to as a signature) and a public key certificate (hereinafter also referred to as a certificate) may be attached to the electronic data to be sent. Upon receiving the electronic data with the digital signature and the certificate, the receiver checks validity of the signature and certificate, confirms that the attached electronic data is not falsified, and in addition, confirms the identification of the sender of the electronic data.

The issuing and validation of public key certificates is conducted in a public key infrastructure, the reference specification of which is stipulated in literature such as RFC 5280 (Internet X.509 Public Key Infrastructure Certificate and CRL Profile). As stipulated in RFC 5280, Chapter 6 (Certification Path Validation), the receiver (hereinafter also referred to as the verifier) constructs a certification path to the certificate which is subjected to a validation from a certificate of a reliable certificate authority (hereinafter also referred to as the CA), and then conducts a validation of the constructed certification path.

In the case where a number of CAs involve with a certificate validation and these CAs are respectively coupled by mutual authentications, a configuration for validation of certificates is likely to be complex, and thus, a process managing the construction and validation of a certification path becomes complicated, too. For this reason, a server (hereinafter referred to as a validation server) that provides services for conducting certificate validation processing instead of the verifier's device and then transmitting the validation result to the verifier may be used. The reference protocol for validation servers is stipulated in RFC 5055 (Server-Based Certificate Validation Protocol). Upon receiving a certificate validation request from a verifier, the validation server constructs a certification path between the reliable CA for the verifier and the certificate which is subjected to a validation and then conducts validation of the constructed certification path. The validation server then adds its signature and certificate to the above validation result and transmits the certificate to the verifier. Upon receiving the validation result from the validation server, the verifier validates the signature and certificate of the validation server that are attached to the validation result, thereby confirming that the validation result is trustworthy.

In addition, in a validation server like the above, it is necessary to perform cryptographic calculations while performing certification path validation processing, such as signature validation processing for certificates or certificate revocation lists (hereinafter referred to as CRLs), and processing to generate a validation server signature for the validation result. In order to reduce the processing load of such cryptographic calculations, hardware security modules (hereinafter referred to as HSMs) like those described in the related Literature 1 (SafeNet, "Luna SA 4.2", [online], SafeNet, P.1, [accessed Jan. 21, 2008], Internet <http://www.safenet-inc.com/library/3/Luna SA.pdf>), Literature 2 (SafeNet, "Luna PCM 2.2", [online], SafeNet, P.1, [accessed Jan. 21, 2008], Internet <http://www.safenet-inc.om/library/3/LunaPC-M.pdf>), and Literature 3 (nCipher, "netHSM", [online], nCipher, P.1, [accessed Jan. 21, 2008], Internet <http://www.ncipher.com/uploads/resources/nethsm.pdf>) are used.

SUMMARY OF THE INVENTION

When conducting cryptographic calculations on a validation server using an HSM like those described in the above Literature 1, 2, and 3, if the processing performance of the validation server is better than that of the HSM or if a very large number of validation requests are received, processing by the HSM may turn out to be a bottleneck and deteriorate overall processing performance of the validation server.

The object of the present invention is to improve the processing performance of a validation server using HSMs by reducing the required process time from receiving a validation request to responding with a validation result.

In order to solve the foregoing problems, the present invention involves providing a validation server with a plurality of HSMs or similar cryptographic modules, and then conducting cryptographic calculations using the least loaded cryptographic module.

For example, an embodiment of the present invention explains a validation server that conducts certificate validation processing comprising a plurality of cryptographic modules that conduct cryptographic calculations included in the validation processing, and a controller. The controller conducts processing to check the load states of the plurality of cryptographic modules, and processing to select the least loaded cryptographic module in accordance with a result of the checked load states, and then to conduct the cryptographic calculations using the selected cryptographic module.

As described above, according to an embodiment of the present invention, the required process time from receiving a validation request to responding with a validation result is reduced on a validation server that uses HSMs, thereby improving the processing performance of the validation server.

BRIEF DESCRIPTION OF THE DRAWINGS

FIG. 3 is a schematic diagram of a cryptographic module list table.
FIG. 4 is a schematic diagram of a compatible cryptographic algorithm table.

DETAILED DESCRIPTION OF THE EMBODIMENTS

Figure 1:
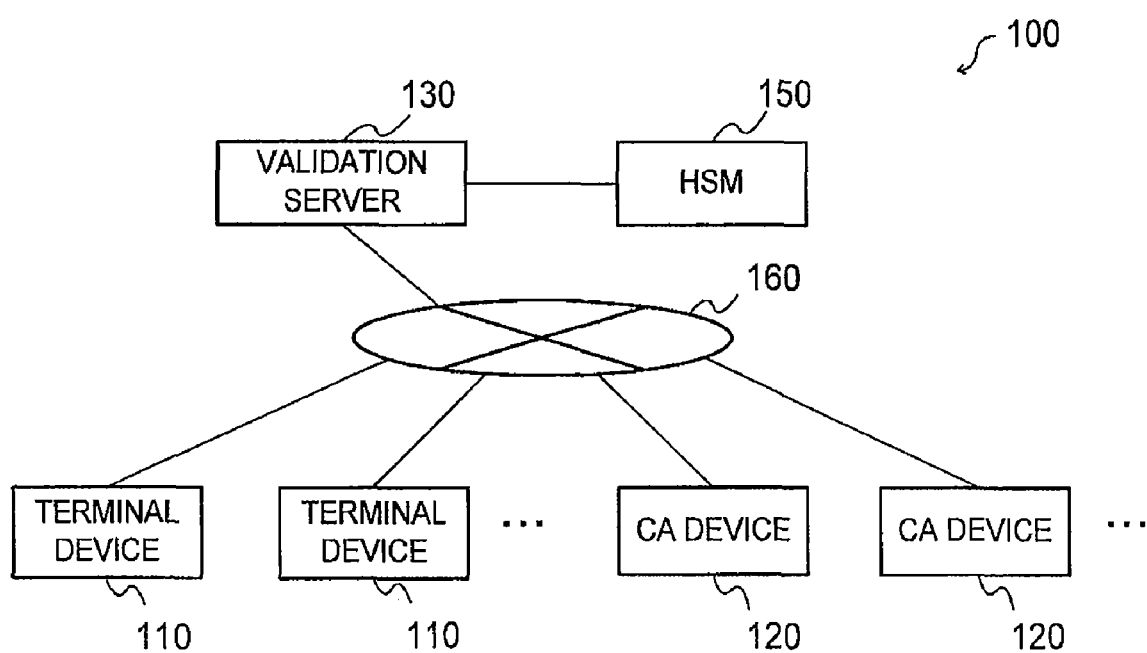
FIG. 1 is a schematic diagram of a validation system.

FIG. 1 is a schematic diagram of a validation system 100 in accordance with an embodiment of the present invention.

As shown in FIG. 1, the validation system 100 comprises a plurality of terminal devices 10, a plurality of CA devices 120, a validation server 130, and an HSM 150. The above components are configured to be able to mutually send and receive information via a network 160.

The terminal devices 110 communicate with other devices via the network 160. More particularly, the terminal devices 110 send and receive electronic documents with attached signatures.

In addition, when a particular terminal device 10 receives a signed electronic document and certificate from another device, the terminal device 110 validates the signature of the signed electronic document using the certificate received simultaneously with the electronic document.

Furthermore, in order to validate the certificate used for signature validation of the signed electronic document, the particular terminal device 10 transmits a validation request to the validation server 130. Attached to the validation request is a CA certificate of a reliable CA (i.e., trusted by the operator of the particular terminal device 110), as well as a certificate which is subjected to a validation.

Subsequently, if the particular terminal device 110 receives a validation result from the validation server 130 indicating that the certificate queried for validation is valid, then the particular terminal device 110 treats that the certificate queried for validation is valid, and the signed electronic document is authentic. The particular terminal device 110 may also output the validation result of the signature of the signed electronic document and the certificate from an output unit if necessary.

When one of the CA devices 120 receives a request to issue a certificate via the network 160, the particular CA device 120 creates a corresponding certificate and sends the certificate by mail or signal transmission. At this point, the certificate is signed using a private key of the particular CA device 120.

Subsequently, the particular CA device 120 registers the created certificate in a certificate database, while also registering information about the recipient (i.e., the originator of the issue request) in a recipient management list.

In addition, when one of the CA devices 120 receives a request to revoke a certificate via the network 160, the particular CA device 120 deletes the certificate to be revoked from the certificate database, while also deleting the information about the recipient of the certificate from the recipient management list.

Subsequently, the particular CA device 120 periodically creates and stores a certificate revocation list (CRL) stating the serial numbers of certificates that have been deleted from the certificate database as a result of revoke requests. The created CRL identifies listing of the serial numbers of the revoked certificates, whose validity is not expired yet, out of all the certificates issued by the particular CA device 120, the respective times when the certificates are revoked, and the respective reasons why the certificates are revoked. In addition, the scheduled time for the next CRL creation is also stated, and a signature is applied using the private key of the particular CA device 120.

In addition, when one of the CA devices 120 receives a CRL request from another device via the network 160, the particular CA device 120 transmits the requested CRL stored in the CA device 120 to the querying device via the network 160.

The method for one of the CA devices 120 to provide certificate revocation information is not limited to a case of issuing a CRL. For example, in some cases, an OCSP responder may be prepared to provide certificate revocation information.

In addition, the numbers of terminal devices 110 and CA devices 120 described above are not particularly limited.

Figure 2:
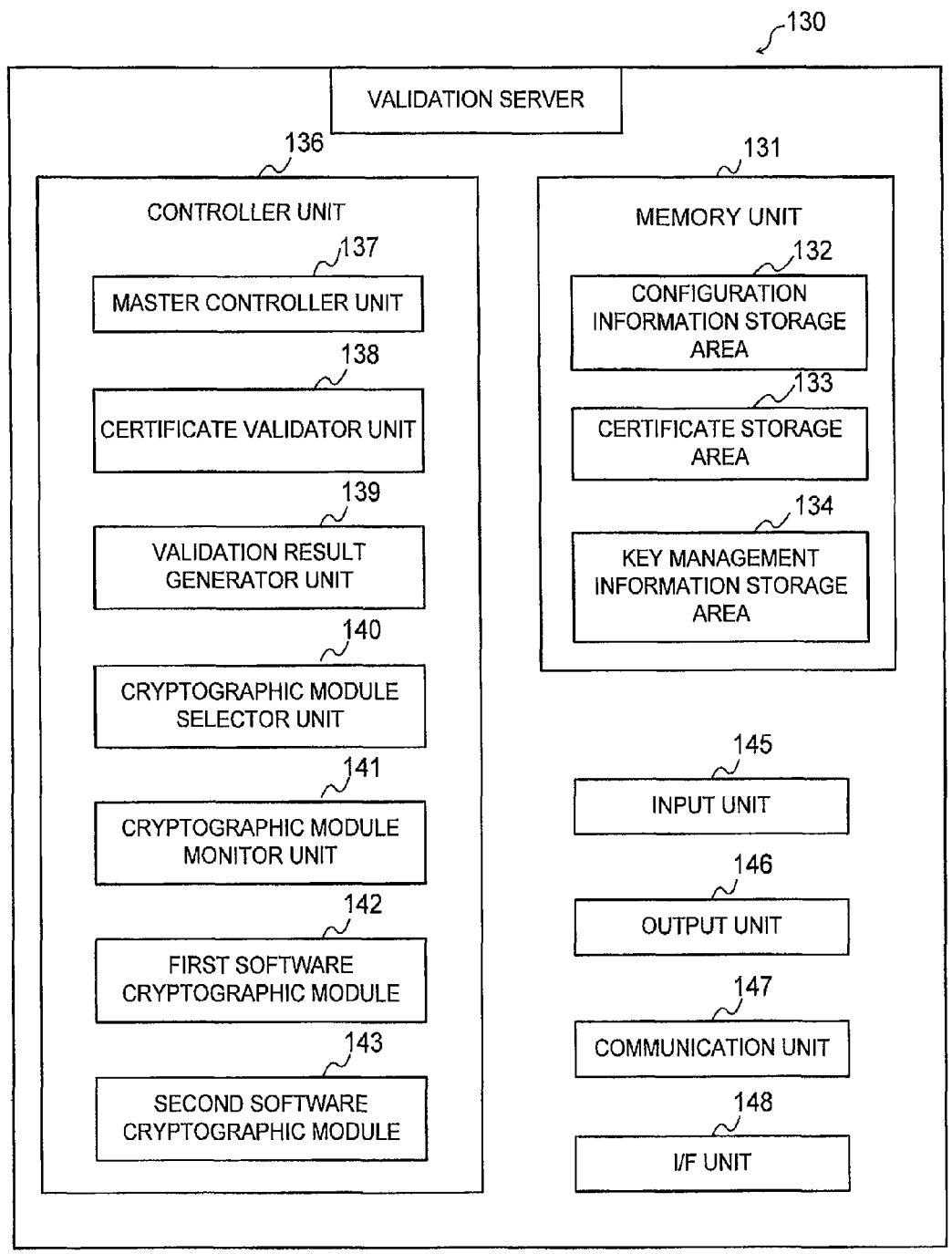
FIG. 2 is a schematic diagram of a validation server.

FIG. 2 is a schematic diagram of the validation server 130.

As shown in FIG. 2, the validation server 130 has a memory unit 131, a controller unit 136, an input unit 145, an output unit 146, a communication unit 147, and an I/F unit 148.

The memory unit 131 has a configuration information storage area 132, a certificate storage area 133, and a key management information storage area 134.

The configuration information storage area 132 stores information specifying cryptographic modules available for the use by the validation server 130, information specifying the cryptographic algorithms compatible with the cryptographic modules available for the use in the validation server 130, information specifying the load states of the cryptographic modules available for the use in the validation server 130, and configuration information required for the validation server 130 to provide validation services.

Figures 5, 6:
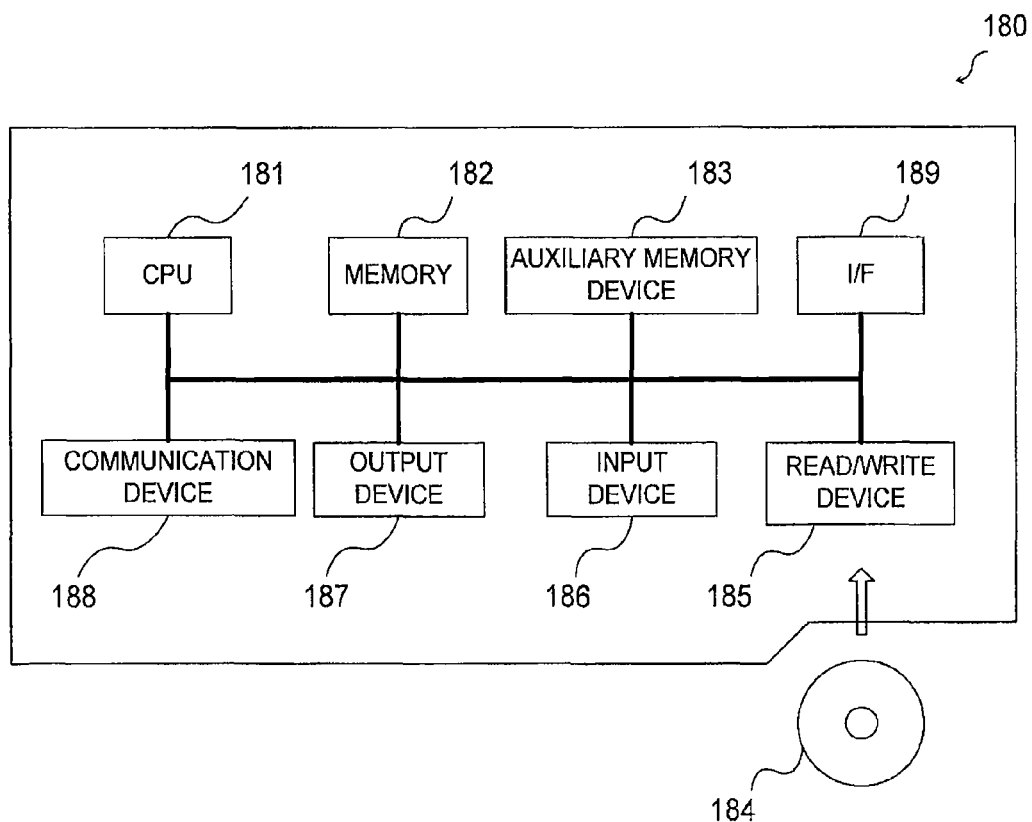
FIG. 5 is a schematic diagram of a load state table.
FIG. 6 is a schematic diagram of a computer.

For example, the configuration information storage area 132 stores a cryptographic module list table 170 like that shown in FIG. 3 (a schematic diagram of a cryptographic module list table 170), the compatible cryptographic algorithm table 171 shown in FIG. 4 (a schematic diagram of a compatible cryptographic algorithm table 171), and the load state table 172 shown in FIG. 5 (a schematic diagram of a load state table 172).

The cryptographic module list table 170 shown in FIG. 3 comprises a cryptographic module identifier field 170a, a configuration information field 170b, and a key management flag field 170c.

In the cryptographic module identifier field 170a, cryptographic module identifiers that act as identification information for identifying cryptographic modules are stored.

In the present embodiment, hardware and software able to conduct cryptographic calculations are referred to as "cryptographic modules". In the present example, a first software cryptographic module 142, a second software cryptographic module 143 and HSM 150 provided in the controller unit 136 of the CA device 130 correspond to "cryptographic modules", and the respective identifiers "first software cryptographic module", "second software cryptographic module", and "HSM" are stored in the cryptographic module identifier field 170a.

In the configuration information field 170b, configuration information necessary for the validation server 130 to conduct cryptographic processing using corresponding cryptographic modules specified in the cryptographic module identifier field 170a is stored.

In the key management flag field 170c, information specifying whether or not the corresponding cryptographic modules specified in the cryptographic module identifier field 170a have the private key of the validation server 130 is stored. In the present embodiment, if the value of "Y" is stored in the key management flag field 170c, then the corresponding cryptographic module specified in the cryptographic module identifier field 170a is taken to have the private key of the validation server 130. However, it should be appreciated that the present invention is not limited to such a configuration.

The cryptographic module list table 170 herein is created in advance by the operator of the validation server 130 via the input unit 145 and then stored in the configuration information storage area 132.

The compatible cryptographic algorithm table 171 shown in FIG. 4 includes a cryptographic algorithm area 171a and a correspondence specification area 171d.

The cryptographic algorithm area 171a has a hash algorithm area 171b and a public key encryption algorithm area 171c. In each row of the hash algorithm area 171b, information specifying a hash algorithm is stored, while in each row of the public key encryption algorithm area 171c, information specifying a public key algorithm is stored.

In each column of the correspondence specification area 171d, information specifying a cryptographic module is stored.

In addition, in the fields at the intersection of an algorithm specified in each row of the cryptographic algorithm area 171*a* and a cryptographic module specified in each column of the correspondence specification area 171*d*, information specifying whether or not that particular cryptographic module is compatible with that particular algorithm is stored. In the present embodiment, if the field found at the intersection of the above is filled with a "circle" mark, then that particular cryptographic module is indicated to be compatible with that particular algorithm. If the field is filled with a "X" mark, then that particular cryptographic module is indicated not to be compatible with that particular algorithm. However, it should be appreciated that the present invention is not limited to such a configuration.

The load state table 172 shown in FIG. 5 comprises a cryptographic module identifier field 172*a* and a load state field 172*b*.

In the cryptographic module identifier field 172*a*, cryptographic module identifiers that act as identification information for identifying cryptographic modules is stored.

In the load state field 172*b*, information specifying the load states of corresponding cryptographic modules specified in the cryptographic module identifier field 172*a* is stored.

Returning to FIG. 2, the certificate storage area 133 stores the certificate of the validation server 130.

The key management information storage area 134 stores management information for managing the private key of the validation server 130 (information specifying a private key label or other data stored in the HSM 150, for example).

The controller unit 136 has a master controller unit 137, a certificate validator unit 138, a validation result generator unit 139, a cryptographic module selector unit 140, a cryptographic module monitor unit 141, a first software cryptographic module 142, and a second software cryptographic module 143.

The master controller unit 137 controls overall processing in the validation server 130.

The certificate validator unit 138 conducts processing in response to a validation request from one of the terminal devices 110 to construct a certification path to the certificate which is subjected to validation using the CA certificate attached to the validation request as a trust anchor.

In addition, the certificate validator unit 138 conducts processing to validate the constructed certification path.

The validation result generator unit 139 conducts processing to create a validation result message according to the validation result of a certificate validated by the certificate validator unit 138.

The cryptographic module selector unit 140 conducts a selection of t the cryptographic module executing processing to validate a certificate or CRL signature when the certificate validator executes the processing to validate the certification path, or alternatively, processing the signature processing when the validation result generator unit 139 creates a validation result document.

The cryptographic module monitor unit 141 conducts the following processing at the predetermined timings (upon initiation of services by the validation server 130, for example). The cryptographic module monitor unit 141 first accesses all cryptographic modules specified in the cryptographic module list table 170 as cryptographic modules available for the use by the validation server 130. The cryptographic module monitor unit 141 then inspects the cryptographic algorithms compatible with the respective cryptographic modules, creates the compatible cryptographic algorithm table 171, and then stores the created table in the configuration information storage area 132. The above processing may be conducted on the basis of PKCS#11 (Public Key Cryptography Standards #11).

In addition, the cryptographic module monitor unit 141 also conducts processing to specify cryptographic modules available for the use by the validation server 130 by the cryptographic module list table 170, monitor the load states of the specified cryptographic modules, and then store the results in the load state table 172.

The first software cryptographic module 142 and the second software cryptographic module 143 respectively conduct cryptographic calculations, such as processing to validate a signature of a certificate or a certificate revocation list as part of certification path validation processing, or processing to generate a signature of a validation server 130 in response to a validation result.

The input unit 145 accepts information input.

The output unit 146 outputs information.

The communication unit 147 sends and receives information via the network 160.

The I/F unit 148 sends and receives information to and from the HSM 150.

The validation server 130 described above can be realized by means of a general computer 180 shown in FIG. 6 (a schematic diagram of a computer 180). The computer 180 may have, for example, a CPU (Central Processing Unit) 181, memory 182, an auxiliary memory device 183 such as an HDD (Hard Disk Drive), a read/write device 185 that reads and writes information with respect to a portable memory medium 184 such as a CD-ROM (Compact Disc Read-Only Memory) or DVD-ROM (Digital Versatile Disc Read-Only Memory), input devices 186 such as a keyboard and mouse, an output device 187 such as a display, a communication device 188 such as a NIC (Network Interface Card) for coupling to a communication network, and an I/F (Interface) 189 such as USB (Universal Serial Bus).

For example, the memory unit 131 may be realized if the CPU 181 uses the memory 182 or the auxiliary memory device 183. The controller unit 136 may be realized if a set program stored in the auxiliary memory device 183 is loaded into the memory 182 and executed by the CPU 181. The input unit 145 may be realized if the CPU 181 uses the input devices 186. The output unit 146 may be realized if the CPU 181 uses the output device 187. The communication unit 147 may be realized if the CPU 181 uses the communication device 188. The I/F unit 148 may be realized if the CPU 181 uses the I/F 189.

The set program may also be configured to be first transferred from the memory medium 184 via the read/write device 185 or downloaded to the auxiliary memory device 183 from a network via the communication device 188, then loaded into the memory 182 and executed by the CPU 181. In addition, the set program may also be configured to be loaded directly into the memory 182 from the storage medium 184 via the read/write device 185 or from a network via the communication device 188, and then executed by the CPU 181.

The HSM 150 may be a general-purpose module as long as a module compatible with at least PKCS#11 is used, and for this reason detailed description thereof is omitted herein.

The HSM 150 is coupled to the validation server 130 directly or via a network. In the present embodiment, the HSM 150 is directly coupled to the validation server 130, as shown in FIG. 1. However, the present invention is not limited to such a configuration.

In addition, although the HSM 150 and the validation server 130 are coupled one-to-one in FIG. 1, the HSM 150 and the validation server 130 may also be coupled in a one HSM-to-a plurality of validation servers, a plurality of HSMs-to-a plurality of validation servers, or a plurality of HSMs-to-one validation server configuration.

Figure 7:
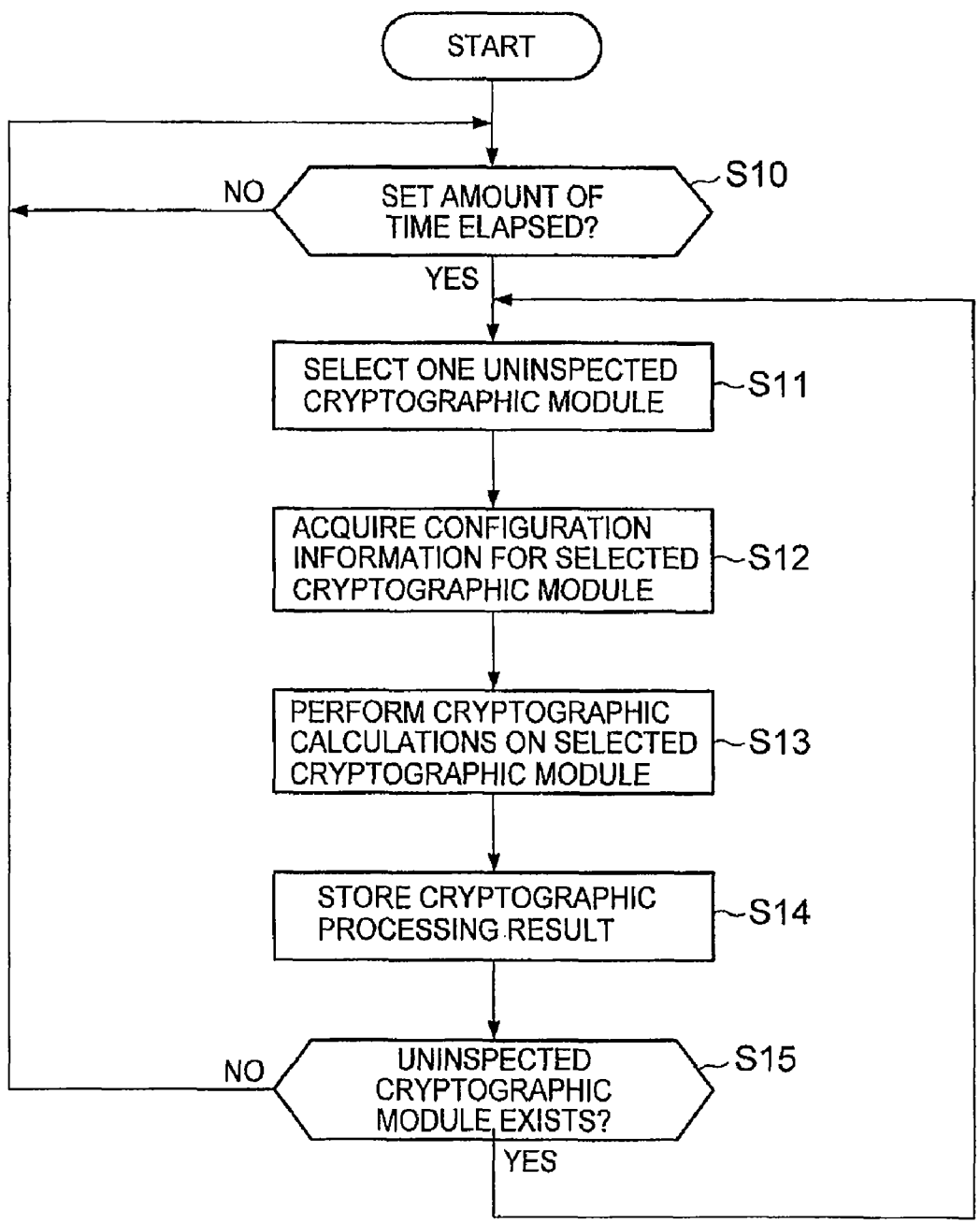
FIG. 7 is a flowchart illustrating processing for monitoring the load states of a plurality of cryptographic modules.

FIG. 7 is a flowchart illustrating processing for monitoring the load states of cryptographic modules in the validation server 130.

First, the cryptographic module monitor unit 141 waits a preconfigured monitor interval, and when a set amount of time (such as several tens of seconds, for example) has elapsed (S10; Yes), the cryptographic module monitor unit 141 selects one uninspected cryptographic module from among those specified in the cryptographic module identifier field 170a of the cryptographic module list table 170 (S11). The cryptographic module monitor unit 141 then acquires configuration information for using the selected cryptographic module from the configuration information field 170b (S12).

Subsequently, the cryptographic module monitor unit 141 performs dummy cryptographic calculations with the cryptographic module that was selected in step S11 (S13). The dummy cryptographic calculations herein may, for example, involve performing processes using the same data with a cryptographic algorithm compatible with all cryptographic modules stored in the cryptographic module identifier field 170a (such as a hash value calculation with respect to test data, for example).

Next, the cryptographic module monitor unit 141 obtains a value for the amount of time taken by the cryptographic calculations performed in step S13 (i.e., the amount of time between outputting calculation instructions to the cryptographic module and receiving a response containing the calculation result), and then stores the time value in the load state table 172 in association with the particular cryptographic module that executes the cryptographic calculations in step S13 (S14).

Subsequently, the cryptographic module monitor unit 141 determines whether or not the processing in steps S12 to S14 has been conducted with respect to all cryptographic modules stored in the cryptographic module list table 170 (S15). If there exists an uninspected cryptographic module (step S15; Yes), then the process returns to step S11 and is repeated again. If all cryptographic modules have been inspected (step S15; No), then the process returns to step S10 and is repeated again.

Figure 8:
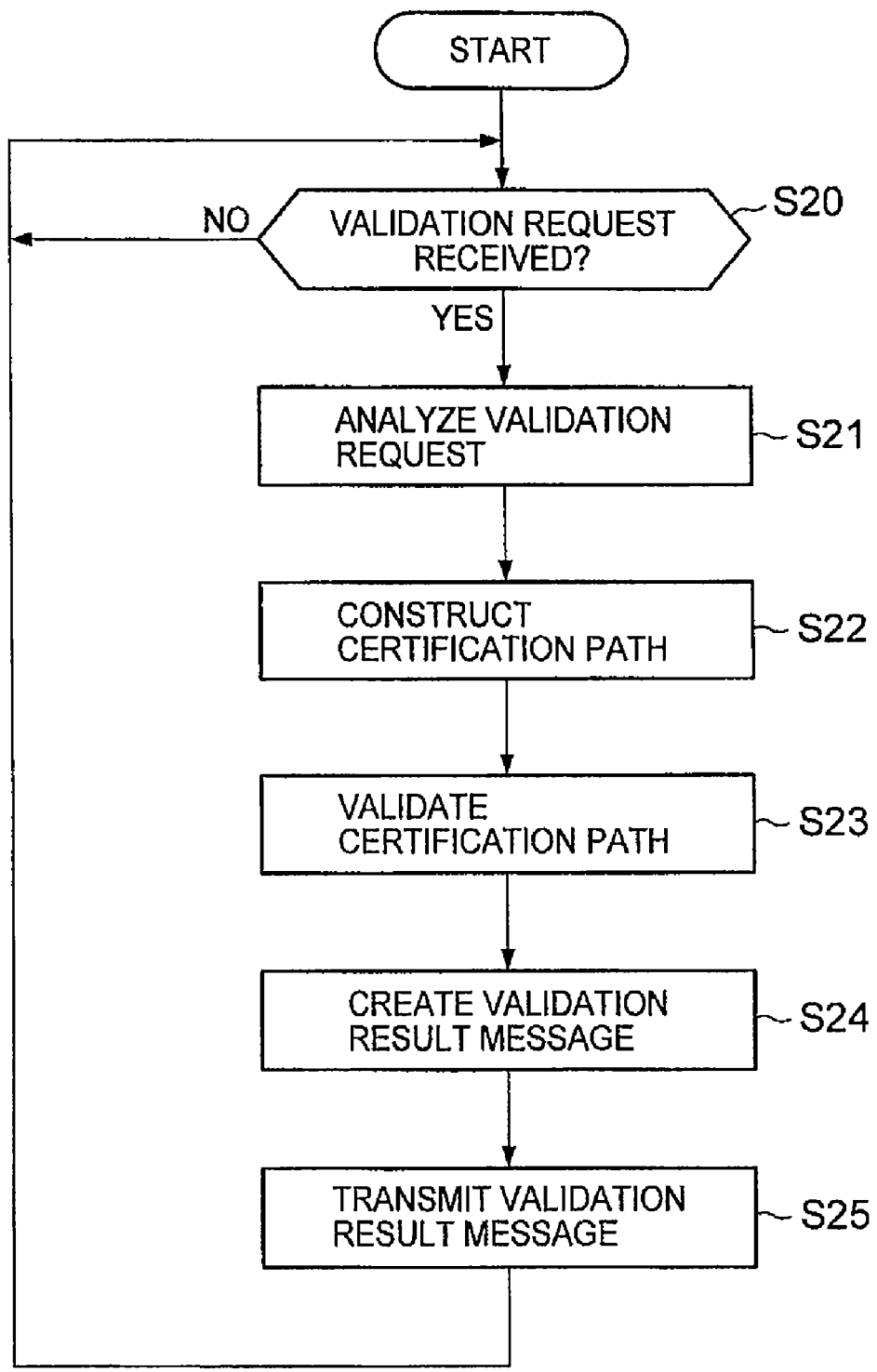
FIG. 8 is a flowchart illustrating processing for validating certificates on a validation server.

FIG. 8 is a flowchart illustrating processing for validating certificates on the validation server 130.

Upon receiving a certificate validation request from one of the terminal devices 110 via the communication unit 147 (S20; Yes), the master controller unit 137 of the validation server 130 passes the validation request to the certificate validator unit 138.

Subsequently, the certificate validator unit 138 acquires, from the received validation request, the CA certificate of the reliable CA device 120 for the user of the terminal device 110, as well as the certificate which is subjected to validation (S21). The certificate validator unit 138 then constructs a certification path from the acquired CA certificate to the acquired certificate which is subjected to validation (S22).

Next, if a certification path is constructed, the certificate validator unit 138 validates the constructed certification path (S23).

For example, the certificate validator unit 138 validates all certificates that constitute the certification path constructed in step S22, with the exception of the CA certificate of the trusted CA, which acts as the path starting point. For each certificate, the attached signature is validated using the public key stated in the CA certificate of the CA device 120 that issued a particular certificate.

In addition, in order to confirm that a given certificate is not revoked, the certificate validator unit 138 also checks the CRL published by the CA device 120 that issued the given certificate or queries an OCSP responder. The above is conducted for all certificates to be validated in the certification path.

Subsequently, the certificate validator unit 138 validates the signature of the issuing CA device 120 attached to the CRL or the OCSP responder using the public key stated in the certificate of the CA device 120. In addition to checking the above items, the certificate validator unit 138 also checks other items stipulated in RFC 5280, Chapter 6 (Certification Path Validation).

Next, the validation result generator unit 139 creates a message stating the result of the certification path validation conducted in step S23 and then generates a signature value with respect to the message using the private key of the validation server 130. The validation result generator unit 139 then attaches the signature value and the certificate of the validation server 130 to the created message, thereby creating a validation result message (S24).

Subsequently, the master controller unit 137 of the validation server 130 transmits the validation result message created in step S24 to the terminal device 110 that transmitted the validation request in step S20 (S25). The process then returns to step S20 and is repeated again.

Figure 9:
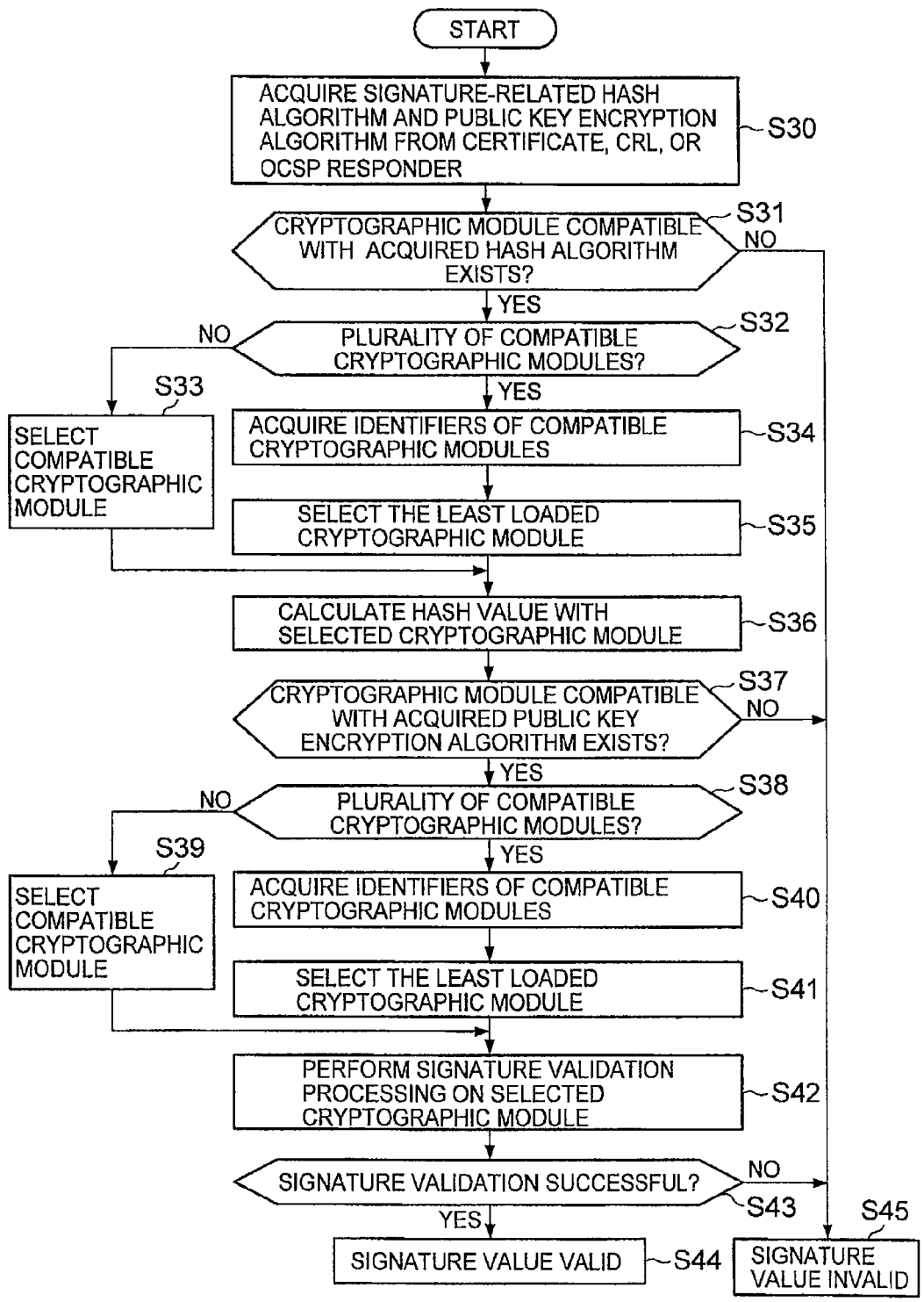
FIG. 9 is a flowchart illustrating processing for validating the signature of a certificate, CRL, or OCSP response.

FIG. 9 is a flowchart illustrating processing for validating the signature of a certificate, CRL, or OCSP response as part of the certification path validation processing conducted in step S23 of FIG. 8.

First, the certificate validator unit 138 acquires a signature-related hash algorithm and a public key encryption algorithm from the certificate to be validated, CRL, or OCSP response (S30).

Next, the certificate validator unit 138 uses the cryptographic module selector unit 140 to search the compatible cryptographic algorithm table 171, taking the hash algorithm acquired in step S30 as the search key. The certificate validator unit 138 thus searches to determine whether or not there exists a cryptographic module compatible with the hash algorithm currently set as the search key (S31).

Subsequently, if the certificate validator unit 138 does not find a cryptographic module compatible with the hash algorithm currently set as the search key (step S31; No), then the process proceeds to step S45. If a compatible cryptographic module is found (step S31; Yes), then the process proceeds to step S32.

In step S32, the certificate validator unit 138 determines whether or not there exists a plurality of cryptographic modules compatible with the hash algorithm currently set as the search key. If a plurality of cryptographic modules compatible with the hash algorithm currently set as the search key does not exist (step S32; No), then the process proceeds to step S33. If a plurality does exist (step S32; Yes), then the process proceeds to step S34.

In step S33, there is only one cryptographic module compatible with the hash algorithm currently set as the search key, and thus the cryptographic module selector unit 140 selects the compatible cryptographic module and then proceeds to step S36.

In contrast, in step S34, the cryptographic module selector unit 140 acquires, from the compatible cryptographic algorithm table 171, the identifiers for all cryptographic modules compatible with the hash algorithm currently set as the search key (S34).

Next, the cryptographic module selector unit 140 searches the load state table 172, using all of the cryptographic module identifiers acquired in step S34 as search keys. The cryptographic module selector unit 140 then selects the least loaded cryptographic module from among the cryptographic modules corresponding to the cryptographic module identifiers currently set as search keys (S35). In the present embodiment, the cryptographic module which identifies the minimum value of time in the corresponding load state field 172b of the load state table 172 is selected. In the case where there exists a plurality of cryptographic modules indicating the same minimum values of time, a single cryptographic module is specified in accordance with a predetermined rule, such as a rule prioritizing the HSM 150.

Subsequently, in step S36, the certificate validator unit 138 uses the cryptographic module selected by the cryptographic module monitor unit 141 to perform hash calculation for signature validation (S36). More specifically, the selected cryptographic module is used to implement the hash algorithm acquired in the step S30 and perform hash calculations with respect to the message of signature portion of the certificate to be validated, CRL, or OCSP response. The value obtained as a result is then combined with the identifier of the hash algorithm (OID) to obtain a hash value.

Next, the certificate validator unit 138 searches the compatible cryptographic algorithm table 171 taking the public key encryption algorithm acquired in step S37 as the search key. The certificate validator unit 138 thus searches to determine whether or not there exists a cryptographic module compatible with the public key encryption algorithm currently set as the search key (S37).

Subsequently, if the certificate validator unit 138 does not find a cryptographic module compatible with the public key encryption algorithm currently set as the search key (step S37; No), then the process proceeds to step S45. If a compatible cryptographic module is found (step S37; Yes), then the process proceeds to step S38.

In step S38, the certificate validator unit 138 determines whether or not there exists a plurality of cryptographic modules compatible with the public key encryption algorithm currently set as the search key. If a plurality of cryptographic modules compatible with the public key encryption algorithm currently set as the search key do not exist (step S38; No), then the process proceeds to step S39. If a plurality of cryptographic modules exist (step S38; Yes), then the process proceeds to step S40.

In step S39, there is only one cryptographic module compatible with the public key encryption algorithm currently set as the search key, and thus the cryptographic module selector unit 140 selects the compatible cryptographic module and then proceeds to step S42.

In step S40, the cryptographic module selector unit 140 acquires, from the compatible cryptographic algorithm table 171, the identifiers for all cryptographic module compatible with the public key encryption algorithm currently set as the search key.

Next, the cryptographic module selector unit 140 searches the load state table 172, using all of the cryptographic module identifiers acquired in step S40 as search keys. The cryptographic module selector unit 140 then selects the least loaded cryptographic module from among the cryptographic modules corresponding to the cryptographic module identifiers currently set as search keys (S41). In the present embodiment, the cryptographic module which identifies the minimum value of time in the corresponding load state field 172b of the load state table 172 is selected. In the case where there exists a plurality of cryptographic modules indicating the same minimum values of time, a single cryptographic module is specified in accordance with a predetermined rule, such as a rule prioritizing the HSM 150.

Subsequently, the certificate validator unit 138 decrypts the signature value to be validated by using the selected cryptographic module, and conducts signature validation processing by confirming that the decryapted data and the hash value obtained in step S36 are identical (S42). More specifically, signature validation is conducted on the selected cryptographic module using the following as input values: the public key encryption algorithm acquired in step S30; the public key stated in the CA certificate of the CA device 120 that published the certificate to be validated, CRL, or OCSP response; the signature value of the certificate to be validated, CRL, or OCSP response; and the hash value acquired in step S36. In other words, the selected cryptographic module decrypts the input signature value using the input public key by means of the input public key encryption algorithm. If the decrypted data obtained as a result is identical to the input hash value, then the cryptographic module replies to the certificate validator unit 138 with information indicating that signature validation is successful. If the decrypted data is different from the input hash value, then the cryptographic module replies to the certificate validator unit 138 with information indicating that signature validation is failed.

Next, the certificate validator unit 138 receives the signature validation result from the selected cryptographic module. If the received validation result is a success (S43; Yes), then the certificate validator unit 138 determines that the signature of the certificate which is subjected to validation is valid (S44), and then continues the certification path validation processing.

In contrast, if the received validation result is a failure (step S43; No), then the process proceeds to step S45.

In step S45, the certificate validator unit 138 determines that the signature of the certificate which is subjected to validation is not valid, and thus also determines that the certification path validation processing is failed.

Figure 10:
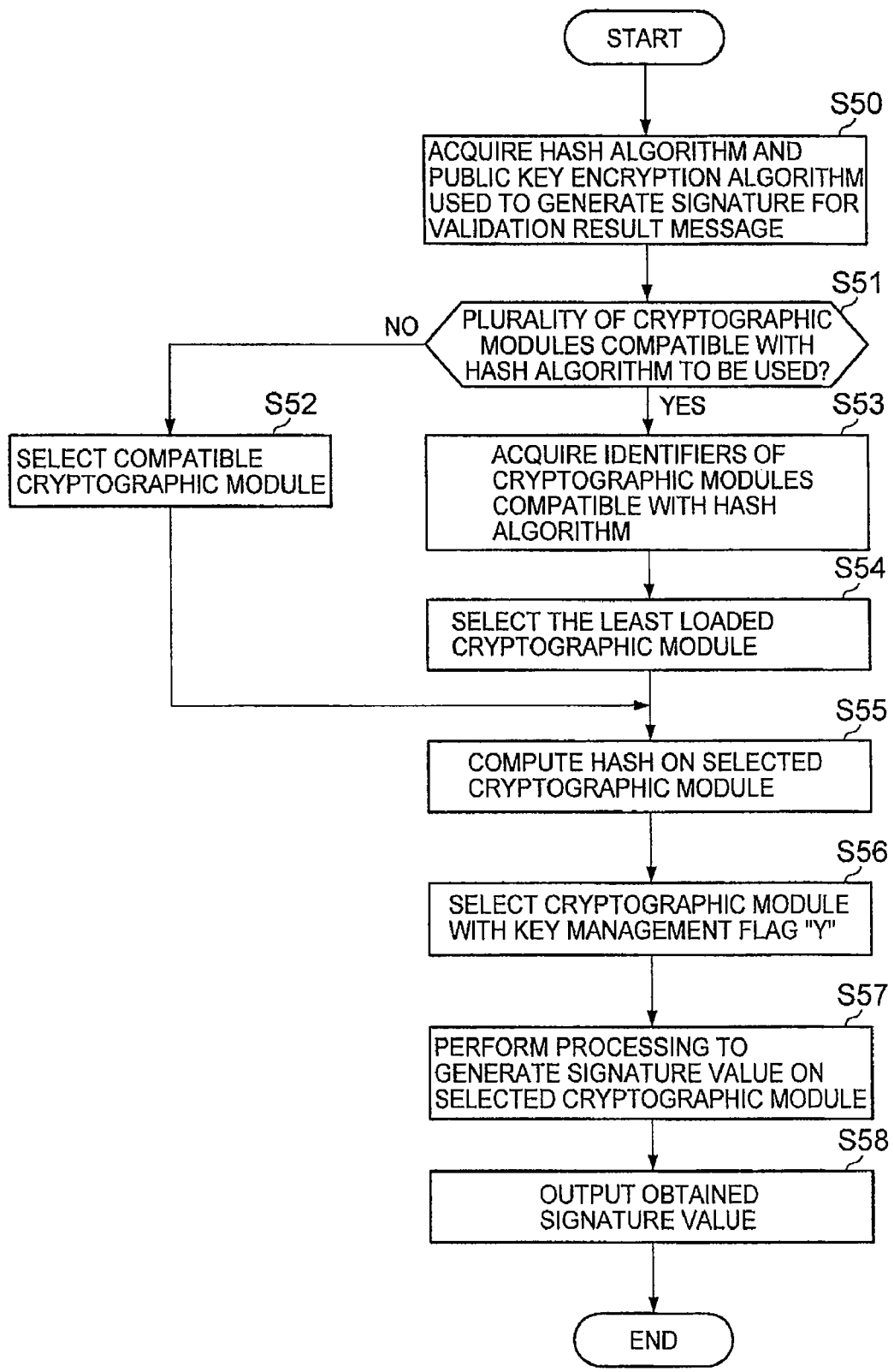
FIG. 10 is a flowchart illustrating processing for generating a digital signature using the private key of a validation server.

FIG. 10 is a flowchart illustrating processing for generating a digital signature using the private key of the validation server 130.

The validation result generator unit 139 acquires a hash algorithm and a public key encryption algorithm to be used when the validation server 130 generates a signature for a validation result message from the private key information of the validation server 130 (S50) that have been set by the operator of the validation server 130. Herein, the acquired information is to be stored in the key management information storage area 134.

Next, the validation result generator unit 139 uses the cryptographic module selector unit 140 to search the compatible cryptographic algorithm table 171, taking the hash algorithm acquired in step S50 as the search key. The validation result generator unit 139 thus checks whether or not there exists a plurality of cryptographic modules compatible with the hash algorithm currently set as the search key (S51).

Subsequently, if a plurality of cryptographic modules compatible with the hash algorithm currently set as the search key do not exist (step S51; No), then the process proceeds to step S52. If a plurality of cryptographic modules exist (step S51; Yes), then the process proceeds to step S53.

In step S52, there is only one cryptographic module compatible with the hash algorithm currently set as the search key, and thus the cryptographic module selector unit 140 selects the compatible cryptographic module and proceeds to step S55.

In contrast, in step S53, the cryptographic module selector unit 140 acquires, from the compatible cryptographic algorithm table 171, the identifiers for all of the cryptographic modules compatible with the hash algorithm currently set as the search key.

Next, the cryptographic module selector unit 140 searches the load state table 172, using all of the cryptographic module identifiers acquired in step S53 as search keys. The cryptographic module selector unit 140 then selects the least loaded cryptographic module from among the cryptographic modules corresponding to the cryptographic module identifiers currently set as search keys (S54). In the present embodiment, the cryptographic module which identifies the minimum value of time in the corresponding load state field 172b of the load state table 172 is selected. In the case where there exists a plurality of cryptographic modules indicating the same minimum values of time, a single cryptographic module is specified in accordance with a predetermined rule, such as a rule prioritizing the HSM 150.

In step S55, the validation result generator unit 139 uses the selected cryptographic module to perform hash calculations for generating a signature. More specifically, the validation result message to be signed is input into the selected cryptographic module and hash calculations are conducted by means of the hash algorithm acquired in step S50. The value obtained as a result is then combined with an identifier specifying the hash algorithm used (i.e., an OID), thereby obtaining a hash value.

Next, the validation result generator unit 139 searches the cryptographic module list table 170 to find a cryptographic module having the value of "Y" stored in the key management flag field 170c. The validation result generator unit 139 then acquires the identifier of the searched cryptographic module (S56).

Subsequently, the validation result generator unit 139 uses the cryptographic module corresponding to the cryptographic module identifier acquired in step S56 to encrypt the hash value computed in step S55 using the private key of the validation server 130 (S57). More specifically, the validation result generator unit 139 inputs the following input values into the cryptographic module acquired in step S56: the public key encryption algorithm acquired in step S50; information for specifying the private key of the validation server 130; and the hash value obtained in step S55. The hash value input into the cryptographic module is then encrypted using the private key corresponding to the input information for specifying the private key.

Subsequently, the cryptographic module outputs the signature value obtained in step S57 to the validation result generator unit 139 (S58). Upon receiving the signature value, the validation result generator unit 139 attaches, to a message indicating the validation result, the signature value and the certificate of the validation server 130 corresponding to the private key stored in the key management information storage area 134, and thereby obtains a validation result message.

In step S56, if there exists a plurality of cryptographic modules having the value of "Y" stored in the key management flag field 170c (in other words, if there exists a plurality of cryptographic modules managing the private key of the validation server 130), then the encoding processing in step S57 may be conducted such that the least loaded cryptographic module from among the cryptographic modules having the above described private key is selected.

As described in the foregoing, according to an embodiment of the present invention, a validation server 130 is able to efficiently process cryptographic calculations on both the HSM 150 and the validation server 130, even when a very large number of validation requests from a large number of terminal devices 110 are received. As a result, the overall processing performance of the validation server 130 is improved, and the amount of time between receiving a validation request and transmitting a validation result is reduced.

In addition, by managing the algorithms compatible with the HSM 150 and the software cryptographic modules 142 and 143 using the compatible cryptographic algorithm table 171, a suitable cryptographic module is automatically selected even when cryptographic calculations are to be conducted using a cryptographic algorithm that is not compatible with one or more cryptographic modules. The administrator of the validation server 130 also does not need to keep track of which cryptographic module is being used, thereby reducing operational workload.

It should be appreciated that the present invention is not limited to the embodiment described in the foregoing, and that various modifications are also possible within the subject and scope thereof.

For example, the embodiment described in the foregoing identifies a method whereby the cryptographic module monitor unit 141 of the validation server 130 monitors the load states of cryptographic modules. The method realizes the monitoring by conducting cryptographic calculations on each cryptographic module at specific intervals, and then measuring the amount of time taken to perform such cryptographic calculations. Further, the cryptographic module monitor unit 141 may also, for example, detect the CPU usage of the validation server 130 and the HSM 150 at specific intervals, and then store the detected CPU usage values in the load state field 172b of the load state table 172. In such a case, the component with the lowest CPU usage may be used for actual cryptographic calculations as the least loaded one.

In addition, instead of monitoring each cryptographic module at specific intervals, the cryptographic module monitor unit 141 may monitor load states by monitoring a processing time of an individual cryptographic module whenever it generates a hash value as part of signature validation processing, and then storing the processing time in the load state table 172 of the load state table 172. In this case, the validation server 130 may be configured to fundamentally use all of the cryptographic modules in order so that processing times of all cryptographic modules can be inspected. The validation server 130 may then be configured such that, if the processing time of any module exceeds a set amount of time, such a module is determined to be excluded for processing, and then a task can be switched to other module.

In addition, in the case where the processing performance of the validation server 130 is clearly superior to the processing performance of the HSM 150, then the validation server 130 may be configured such that, instead of using the cryptographic module selector unit 140 to select a cryptographic module each time a validation request is received, the software cryptographic modules 142 and 143 on the validation server 130 may always be configured to perform the hash calculations for the signature validation processing of certification path validation processing as well as for the processing to generate a signature value for a validation result message. Then the HSM 150 may only be used to perform the public key encryption processing to generate a signature for a validation result message.

What is claimed is:

1. A validation server that conducts certificate validation processing, comprising:
a processor; and
a memory unit storing compatible cryptographic algorithm information specifying cryptographic algorithms, and cryptographic modules compatible with the cryptographic algorithms, the processor being programmed to perform cryptographic calculations in the validation processing in accordance with the cryptographic modules,
the processor performing:
checking load states of the cryptographic modules,
specifying, from the compatible cryptographic algorithm information stored in the memory unit, a cryptographic module compatible with a cryptographic algorithm used in the cryptographic calculations, and
conducting the cryptographic calculations by using the least loaded cryptographic module selected from all specified cryptographic modules when a plurality of cryptographic modules are specified.

2. The validation server according to claim 1, wherein:
at least one of the cryptographic modules is an HSM.

3. The validation server according to claim 1, wherein:
at least one of the cryptographic modules is executed to perform the cryptographic calculations.

4. The validation server according to claim 1, wherein:
the cryptographic modules are executed to perform the cryptographic calculations using test data and determine, as amount of time required for processing becomes longer, that loads are heavier to conduct the cryptographic calculations.

5. A non-transitory tangible machine-readable medium having a program for controlling a computer to perform cryptographic calculations in certificate validation processing, the computer including a memory unit storing compatible cryptographic algorithm information specifying cryptographic algorithms, and cryptographic modules compatible with the cryptographic algorithms, the program, when executed, causing the computer to perform the steps of: a control means,
checking load states of the cryptographic modules;
specifying, from the compatible cryptographic algorithm information stored in the memory unit, a cryptographic module compatible with a cryptographic algorithm to be used in the cryptographic calculations; and
conducting the cryptographic calculations by using the least loaded cryptographic module selected from all specified cryptographic modules when a plurality of cryptographic modules are specified.

6. The program according to claim 5, wherein:
at least one of the plurality of cryptographic module means is an HSM.

7. The program according to claim 5, wherein:
at least one of the cryptographic modules is realized by executing software on the computer.

8. The program according to claim 5, wherein:
the program makes the computer execute steps of:
executing cryptographic calculations using test data; and
determining, as amount of time required for processing becomes longer, that loads are heavy.

9. A validation method conducted by a validation server to conduct certificate validation processing,
the validation server comprising:
a processor; and
a memory unit storing compatible cryptographic algorithm information specifying cryptographic algorithms, and cryptographic modules compatible with the cryptographic algorithms, the processor being programmed to perform cryptographic calculations in the validation processing in accordance with the cryptographic modules,
the method comprising the steps of:
checking load states of the cryptographic modules;
specifying from the compatible cryptographic algorithm information stored in the memory unit, a cryptographic module compatible with a cryptographic algorithm to be used in the cryptographic calculations; and
conducting the cryptographic calculations by using the least loaded cryptographic module selected from all specified cryptographic modules when a plurality of cryptographic modules are specified,
wherein at least one of the steps are performed by the processor.

10. The validation method according to claim 9, wherein:
at least one among the plurality of cryptographic modules is an HSM.

11. The validation method according to claim 9, wherein:
at least one of the cryptographic modules is realized by executing software on the computer.

12. The validation method according to claim 9, wherein:
the processor, in the cryptographic calculation processing, further performs the steps of:
making the cryptographic modules execute cryptographic calculations using test data; and
determining, as amount of time required for processing becomes longer, that loads are heavy.

* * * * *